(12) United States Patent
Senga

(10) Patent No.: US 9,314,950 B2
(45) Date of Patent: Apr. 19, 2016

(54) FIXED PLATEN OF INJECTION MOLDING MACHINE

(71) Applicant: FANUC Corporation, Yamanashi (JP)

(72) Inventor: Masatoshi Senga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/612,539

(22) Filed: Feb. 3, 2015

(65) Prior Publication Data

US 2015/0224691 A1  Aug. 13, 2015

(30) Foreign Application Priority Data

Feb. 10, 2014 (JP) ................... 2014-023679

(51) Int. Cl.
*B29C 45/17* (2006.01)

(52) U.S. Cl.
CPC .................. *B29C 45/1744* (2013.01)

(58) Field of Classification Search
CPC .......... B29C 45/1744; B29C 45/1747
See application file for complete search history.

(56) References Cited

U.S. PATENT DOCUMENTS

| 5,776,402 | A | 7/1998 | Glaesener | |
|---|---|---|---|---|
| 6,027,329 | A * | 2/2000 | Nazarian et al. | 425/589 |
| 7,318,721 | B2 * | 1/2008 | Spicer et al. | 425/472 |
| 7,491,051 | B2 * | 2/2009 | Matsushita et al. | 425/190 |
| 7,857,612 | B2 * | 12/2010 | Teng et al. | 425/472 |
| 8,163,218 | B2 * | 4/2012 | Kato et al. | 264/255 |
| 2007/0187871 | A1 | 8/2007 | Nagata et al. | |
| 2007/0269549 | A1 | 11/2007 | Matsushita et al. | |
| 2008/0160131 | A1 | 7/2008 | Sasaki et al. | |
| 2010/0244314 | A1 | 9/2010 | Kato et al. | |

FOREIGN PATENT DOCUMENTS

| EP | 1287962 | * | 3/2003 |
|---|---|---|---|
| EP | 2251173 | A1 | 11/2010 |
| JP | H07-35020 | U | 6/1995 |
| JP | 9-38984 | A | 2/1997 |
| JP | 2008-162103 | A | 7/2008 |
| JP | 2009-66774 | A | 4/2009 |
| JP | 2010-111018 | A | 5/2010 |
| JP | 2010-179623 | A | 8/2010 |
| JP | 2013-244740 | A | 12/2013 |
| WO | 2005/084909 | A1 | 9/2005 |
| WO | 2006/115141 | A1 | 11/2006 |
| WO | 2009/107605 | A1 | 9/2009 |
| WO | 2009/118833 | A1 | 10/2009 |

OTHER PUBLICATIONS

Office Action mailed Apr. 21, 2015, corresponding to Japanese patent application No. 2014-023679.

* cited by examiner

*Primary Examiner* — James Mackey
(74) *Attorney, Agent, or Firm* — Hauptman Ham, LLP

(57) ABSTRACT

A fixed platen of an injection molding machine is constituted by a mold mounting portion, a tie bar support portion disposed to be spaced apart from the mold mounting portion, and a load transmitting portion that connects the mold mounting portion with the tie bar support portion. Furthermore, the load transmitting portion is constituted by a cross-shaped connecting portion, and an extension connecting portion that extends along the outer circumferential portion of the mold mounting portion.

3 Claims, 5 Drawing Sheets

FIXED PLATEN OF INJECTION MOLDING MACHINE

RELATED APPLICATIONS

The present application claims priority to Japanese Application Number 2014-023679, filed Feb. 10, 2014, the disclosure of which is hereby incorporated by reference herein in its entirety.

BACKGROUND OF THE INVENTION

1. Field of the Invention

The present invention relates to a fixed platen used in an injection molding machine.

2. Description of the Related Art

A mold clamping mechanism of an injection molding machine is equipped with a fixed platen fixed to a base frame, and a movable platen disposed to be movable with respect to the fixed platen, while maintaining a posture that is parallel to the fixed platen. Furthermore, a fixed-side mold is mounted to the fixed platen, and a movable-side mold is mounted to the movable platen. These molds are opened and closed, and clamped by moving the movable platen forward and backward with respect to the fixed platen.

The mold clamping mechanism is required to reliably clamp the fixed platen and the movable platen against the pressure of resin to be injected into the mold. Moreover, the fixed platen is supported by tie bars that are generally disposed at four corners thereof.

Here, an example of a conventional mold clamping mechanism will be described with reference to FIG. 9A (front view) and FIG. 9B (side view).

Since the mold clamping mechanism receives a reaction force of the mold clamping force from the molds (a fixed-side mold 4 and a movable-side mold 5) mounted on central portions of mold mounting surfaces when the molds are clamped, the mold mounting surfaces receive the pressure in a manner such that they are deformed into a bowl shape. Therefore, force escapes from the central portion of the mold and a contact surface pressure is lowered, and thus, there is concern that burr occurs in a molded article. Furthermore, on the contrary, when the excessive pressure locally acts on the mold, there is also concern that the mold may be deformed, or the mold itself may be damaged. In FIG. 9B, Reference numeral 2 denotes a fixed platen, and reference numeral 6 denotes tie bars 6.

In order to reduce a difference in pressure depending on locations of a platen, it is effective to improve rigidity of the platen, but in a method of simply increasing a thickness of the platen, the platen weight increases, which leads to increased costs. For that reason, a shape capable of improving rigidity without increasing the weight compared to the related art has been proposed.

Japanese Utility Model Application Laid-Open No. 7-35020 discloses a technique in which, in at least one of a fixed platen and a movable platen, a notch portion reaching a tie bar insertion hole from an outer circumferential portion for preventing the deformation of a mold mounting surface is provided at least in a region of the tie bar insertion hole in an intermediate portion in its thickness direction of the platen.

However, in the above-described technique, in case where a notch is provided over the entire circumference by increasing a notch portion, in some cases, an outer circumferential portion of mold mounting portion cannot fully support the mold clamping force, as a result, the outer circumferential portion of a mold mounting portion may be deformed in the opposite direction such that the outer circumferential portion of the mold may open. In addition, in some cases, due to an increase in deformation of a tie bar fixing portion, the tie bar is bended, and thus, failures such as break of the tie bar may occur.

WO 2005/084909 A discloses a technique in which, as illustrated in FIG. 10A (front view) and FIG. 10B (side view), a central region of a mold mounting portion and a central region of a back portion of a mold support device are connected by a central connecting member, and an outer circumferential portion of the mold mounting portion and an outer circumferential portion of the back portion of the mold support device are connected by an outer circumferential portion connecting member, with the result that a portion for transmitting a load to the mold mounting portion of the fixed platen 2 is provided in the central portion and in the outer circumferential portion so as not to open the outer circumferential portion.

However, in the above-described technique, since the portion for transmitting a load to the mold mounting portion of the fixed platen 2 is divided into the central portion and the outer circumferential portion with a space left therebetween, as a result, depending on the size of the mold, the outer circumferential portion of the mold may be located in the space so that a force is not transmitted to the outer circumferential portion of the mold. Furthermore, when a large mold is mounted, as illustrated in FIG. 10B, its outer circumferential portion may be deformed toward a cored opening, and therefore, a gap may be generated on the outer circumferential portion of the mold and burrs may occur.

Japanese Patent Application Laid-Open No. 2010-111018 discloses a technique in which, to cope with concentration of the pressure on the mold corners due to deformation of the fixed platen, a portion for transmitting a load to the mold mounting portion of the movable platen is provided in a central portion and an extension portion vertically extending from the central portion so that an intermediate pressure between the corners is increased, thereby reducing a pressure difference generated along a joint surface between the fixed mold and the movable mold so as to be uniform.

However, in the above-described technique, the load transmitting portion having the central portion and the extension portion vertically extending from the central portion is provided in the movable platen so that the uniform pressure distribution of the mold is achieved by matching the deformation of the mold mounting surface of the movable platen with the deformation of the mold mounting surface of the fixed platen. However, since the extension portion is provided only in the vertical direction, in some cases, the adjustment of other directions cannot be performed well.

SUMMARY OF THE INVENTION

Thus, an object of the invention is to provide a fixed platen that improves a surface pressure distribution of a mold parting surface without increasing the weight of the platen, and prevents the unbalanced load from being applied to the tie bar.

The fixed platen of the injection molding machine according to the invention includes: a mold mounting portion; a tie bar support portion that is disposed to be spaced apart from the mold mounting portion and has a tie bar insertion portion capable of fixing the tie bar; and a load transmitting portion that connects the mold mounting portion with the tie bar support portion. Further the load transmitting portion includes: a cross-shaped connecting portion that intersects at the center and extends to the vicinity of an outer circumferential portion of the mold mounting portion; and an extension connecting portion that extends along the outer circumferential portion of the mold mounting portion from a location of the cross-shaped connecting portion extending to the vicinity of the outer circumferential portion of the mold mounting portion. And an end portion of the extension connecting portion is spaced apart from the tie bar insertion portion.

The cross-shaped connecting portion may have a tapered shape toward the extension connecting portion from a central portion thereof.

A through hole may be formed which penetrates to the outside from the space between the mold mounting member and the tie bar support portion.

According to the invention, it is possible to provide a fixed platen that improves the surface pressure distribution of the mold parting surface without increasing the weight of the platen and to prevent the unbalanced load from being applied to the tie bar.

BRIEF DESCRIPTION OF THE DRAWINGS

Aforementioned and other objects and features of the invention will become apparent from the following description of embodiments with reference to the accompanying drawings. In these drawings.

DETAILED DESCRIPTION OF THE PREFERRED EMBODIMENTS

First, a first embodiment of the fixed platen according to the invention will be described with reference to FIGS. 1 to 6.

Figure 1:
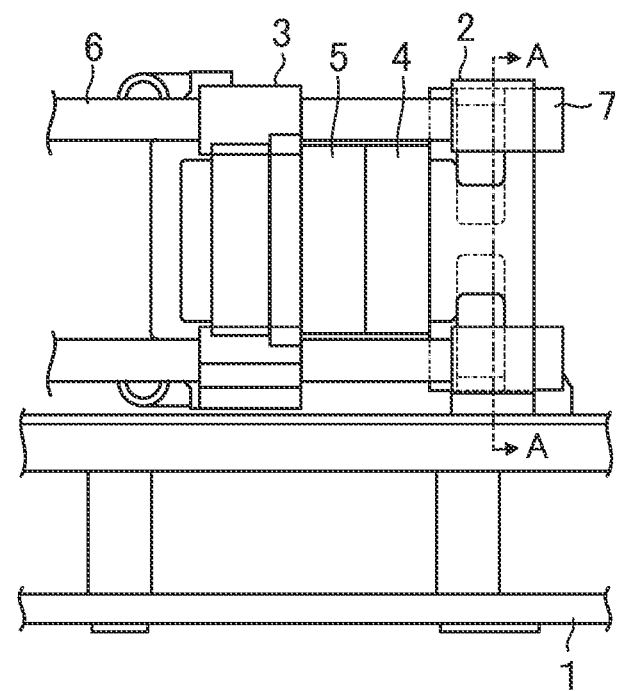
FIG. 1 is a diagram illustrating a mold clamping mechanism of an injection molding machine that uses a first embodiment of a fixed platen according to the invention.

FIG. 1 is a diagram illustrating a mold clamping mechanism of an injection molding machine that uses a first embodiment of the fixed platen according to the invention.

The mold clamping mechanism is equipped with a fixed platen 2 fixed to a base frame 1, and a movable platen 3 which is movably disposed while maintaining a state in which a mold surface (a surface of a fixed-side mold 4 and a surface of a movable-side mold 5 to be described below) is parallel to the fixed platen 2. A rear platen (not illustrated) is provided on a side of the movable platen 3 opposite to the fixed platen 2, at a position spaced apart from the movable platen 3. Furthermore, tie bars 6 are provided between the fixed platen 2 and the rear platen, and a tie bar nut 7 is screw-engaged with an end portion of each of the tie bars 6 penetrating through the fixed platen 2. Furthermore, the fixed-side mold 4 is mounted to the fixed platen 2, and the movable-side mold 5 is mounted to the movable platen 3. Toggle links (not illustrated) are connected to the upper and lower portions of the movable platen 3. Opening and closing, and the mold clamping of the mold are performed, by moving the movable platen 3 forward and backward by the toggle links.

Next, the fixed platen used in the mold clamping mechanism of FIG. 1 will be described with reference to FIGS. 2 and 3.

The fixed platen 2 is configured to mainly include a mold mounting portion 8 on which the mold is mounted, a tie bar support portion 9 disposed to be spaced apart from the mold mounting portion 8, and a load transmitting portion 10 that connects the mold mounting portion 8 and the tie bar support portion 9.

Figure 2:
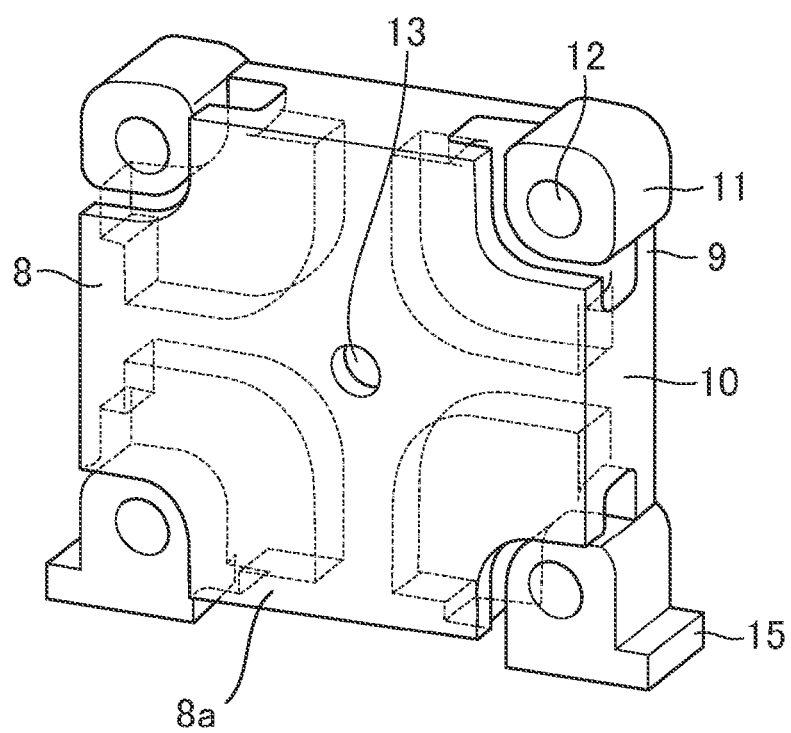
FIG. 2 is a perspective view illustrating a fixed platen used in the mold clamping mechanism of FIG. 1 when viewed from a mold mounting surface side of the mold mounting portion.
Figure 3:
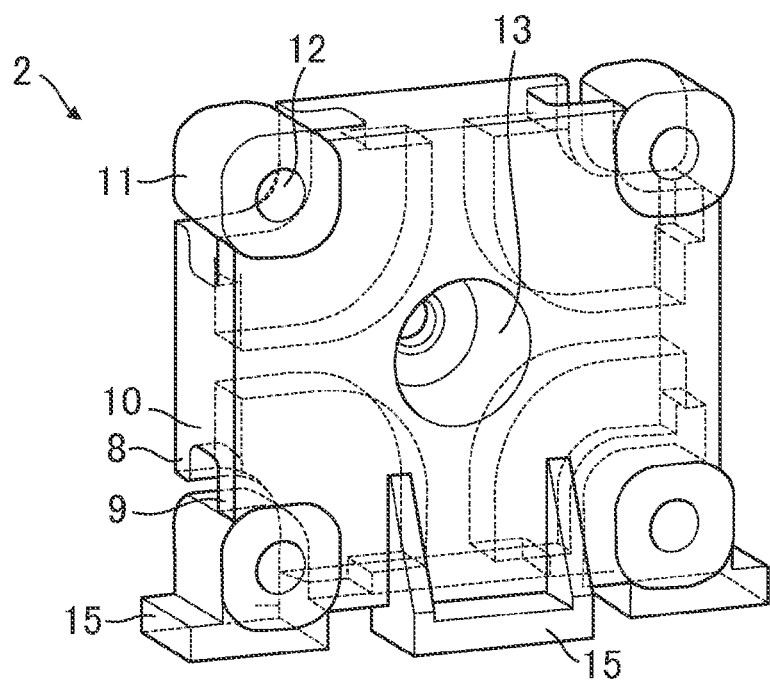
FIG. 3 is a diagram when the fixed platen of FIG. 2 is viewed from an opposite side of FIG. 2.

The mold mounting portion 8 has a substantially rectangular plate-like shape, and a mold mounting surface 8a is formed on the front side thereof, as illustrated in FIG. 2. Mounting elements, such as a tap or a T groove, are machined on the mold mounting surface 8a, and a through hole 13 through which a cylinder (not illustrated) for injecting the resin is inserted is formed in the center thereof.

The tie bar support portion 9 has cylindrical tie bar insertion portions 11 at its four corners. Furthermore, each tie bar insertion portion 11 is formed with a tie bar insertion hole 12. Each of the tie bars 6 is inserted through the tie bar insertion hole 12 so that the end portion of the tie bar 6 is engaged with the tie bar nut 7. At the central portion of the tie bar support portion 9, a through hole 13 through which the injection cylinder is inserted is formed, similarly to the mold mounting portion 8.

Figure 4:
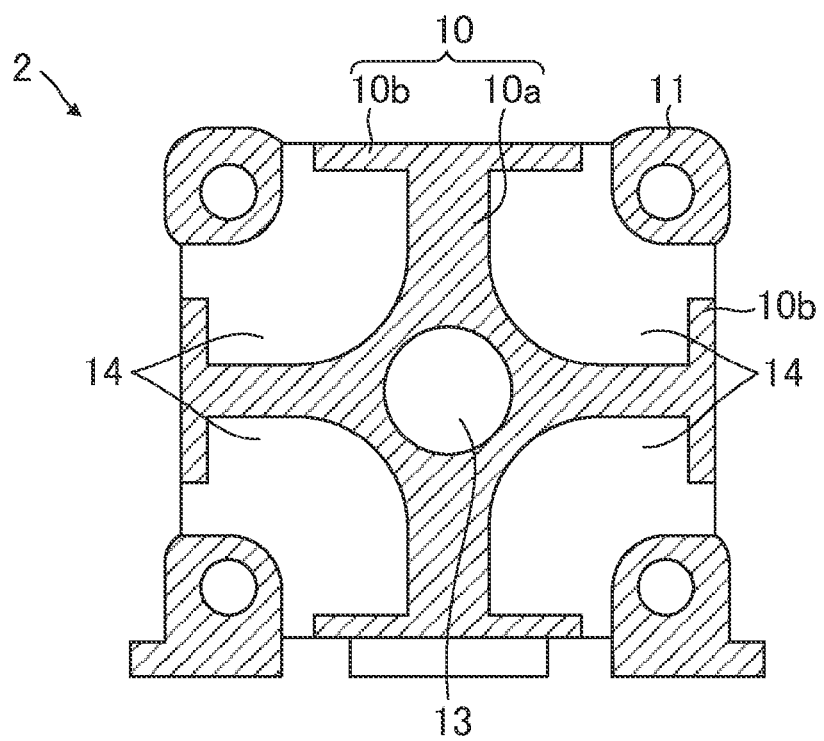
FIG. 4 is a cross-sectional view taken along a line A-A of FIG. 1 and illustrates a shape of a load transmitting portion of the fixed platen illustrated in FIGS. 2 and 3.

The load transmitting portion 10 is disposed between the mold mounting portion 8 and the tie bar support portion 9 to connect the mold mounting portion 8 and the tie bar support portion 9. As illustrated in FIG. 4, the load transmitting portion 10 is configured to include a cross-shaped connecting portion 10a and an extension connecting portion 10b.

The cross-shaped connecting portion 10a extends so as to lead to the vertically and horizontally outer circumferential portions from the central portion, being cruciform as a whole. Moreover, the outer circumferential portion of the cross-shaped connecting portion 10a extends to a position that substantially overlaps the outer circumferential portion of the mold mounting portion 8.

Moreover, the extension connecting portion 10b has a shape that extends along the outer circumferential portion of the mold mounting portion 8 from the outer circumferential portion of the cross-shaped connecting portion 10a. The extension connecting portion 10b extends toward the tie bar insertion portion 11 from the outer circumferential portion of the cross-shaped connecting portion 10a, but its end portion is spaced apart from the tie bar insertion portion 11 (does not extend to come into contact with the tie bar insertion portion 11). Similarly to the mold mounting portion 8 and a belt tie bar support portion 9, the load transmitting portion 10 is also formed with a through hole 13, through which the injection cylinder is inserted, at the central portion.

The mold mounting portion 8, the tie bar support portion 9, and the load transmitting portion 10 are integrally formed, and cored openings 14 are formed at four locations inside the fixed platen 2. The cored openings 14 are in communication with the outside of the fixed platen 2, in the vicinity of the tie bar insertion portion 11. Furthermore, reference numeral 15 in FIG. 3 denotes a foot, and the tie bar support portion 9 is fixed to the base frame 1 via the foot 15.

Figure 5A:
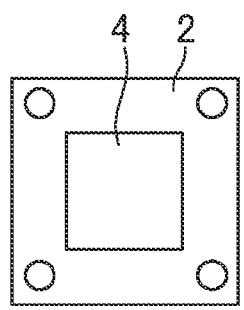
FIGS. 5A and 5B are diagrams (a front view and a side view when viewed from the mold side) illustrating aspects of the deformation of the fixed platen when a mold clamping force is applied to the fixed platen of FIGS. 2 to 4.
Figure 5B:
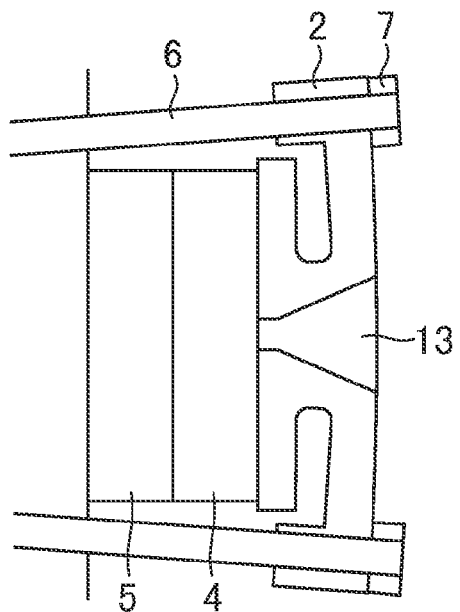

The aspects of deformation of the fixed platen when a mold clamping force is applied to the fixed platen illustrated in FIGS. 2 to 4 will be described using FIG. 5A (a front view), FIG. 5B (a side view) and FIG. 6 (a perspective view).

Figure 6:
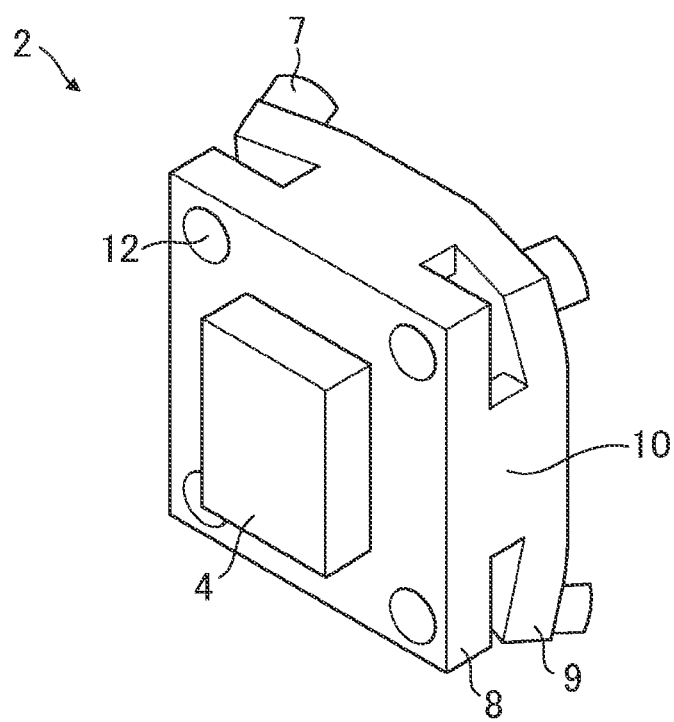
FIG. 6 is a diagram (perspective view) illustrating an aspect of deformation of the fixed platen when a mold clamping force is applied to the fixed platen of FIGS. 2 to 4.

When the mold clamping force is applied to the fixed platen 2, as illustrated in FIG. 6, the tie bar support portion 9 is deformed. In this embodiment, since the tie bar support portion 9 and the mold mounting portion 8 are disposed to be spatially spaced apart from each other, even if the tie bar support portion 9 is deformed, the deformation is not transmitted to the mold mounting portion 8, and therefore the mold is not deformed. Thus, a gap does not occur in the mold, and it is possible to suppress an occurrence of burrs.

Also, as illustrated in FIG. 4, the load transmitting portion 10 configured to connect the mold mounting portion 8 and the tie bar support portion 9 is constituted by the cross-shaped connecting portion 10a and the extension connecting portion 10b, and the outer circumferential portion of the mold is supported by the cross-shaped connecting portion 10a. Thus, deformation such as opening of the outer circumferential portion of the mold is suppressed, and it is possible to prevent an occurrence of burrs on the outer circumferential portion.

Furthermore, since the vertical and horizontal outer circumferential portions of the mold are connected to the extension connecting portions 10b of the load transmitting portion 10, respectively, even if the cored opening 14 formed in the interior of the fixed platen 2 increases, the deformation of the tie bar support portion 9 does not increase accordingly. Accordingly, it is possible to increase the cored opening in the interior of the fixed platen 2, and as a result, it is possible to reduce the weight of the fixed platen 2.

In this embodiment, since the tie bar support portion 9 is configured to have substantially the same size as that of the mold mounting portion 8, the cross-shaped connecting portion 10a extends to the vicinity of the outer circumferential portion of the mold mounting portion 8, but the cross-shaped connecting portion 10a may be configured so as to extend to the inside of the mold mounting portion 8, depending on the size of the tie bar support portion 9. In this case, the extension connecting portion 10b may extend along the inner side than the outer circumferential portion of the tie bar support portion 9.

Next, a second embodiment of the fixed platen according to the present invention will be described with reference to FIG. 7.

Figure 7:
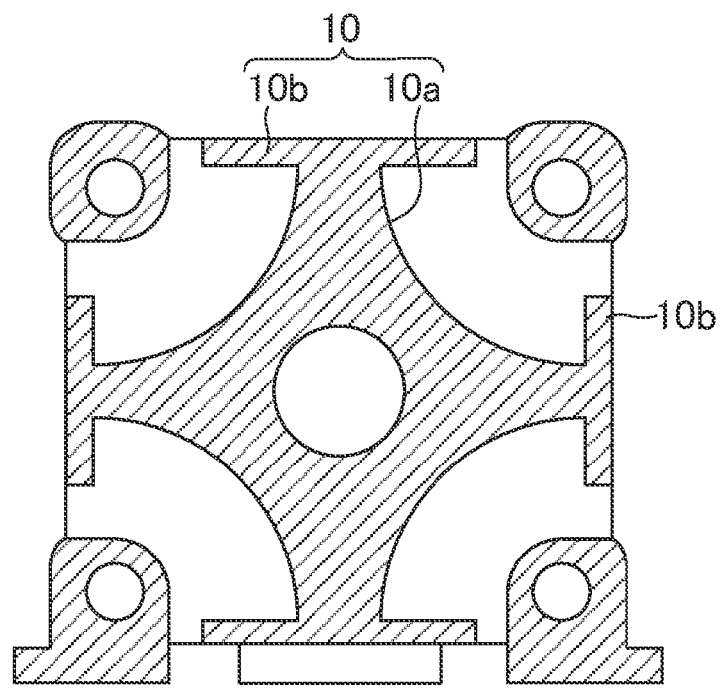
FIG. 7 is a diagram illustrating a second embodiment of the fixed platen according to the invention.

In this embodiment, as illustrated in FIG. 7, the cross-shaped connecting portion 10a of the load transmitting portion 10 is configured to narrow as it approaches the outer circumferential portion. In particular, when a mold to be mounted on the fixed platen 2 becomes larger, the rigidity of the mold becomes higher, and the deformation of the fixed platen 2 decreases. Accordingly, even if the width of the cross-shaped connecting portion 10a near the outer circumferential portion is narrow, it is possible to support the load.

Next, a third embodiment of the fixed platen according to the invention will be described with reference to FIG. 8.

Figure 8:
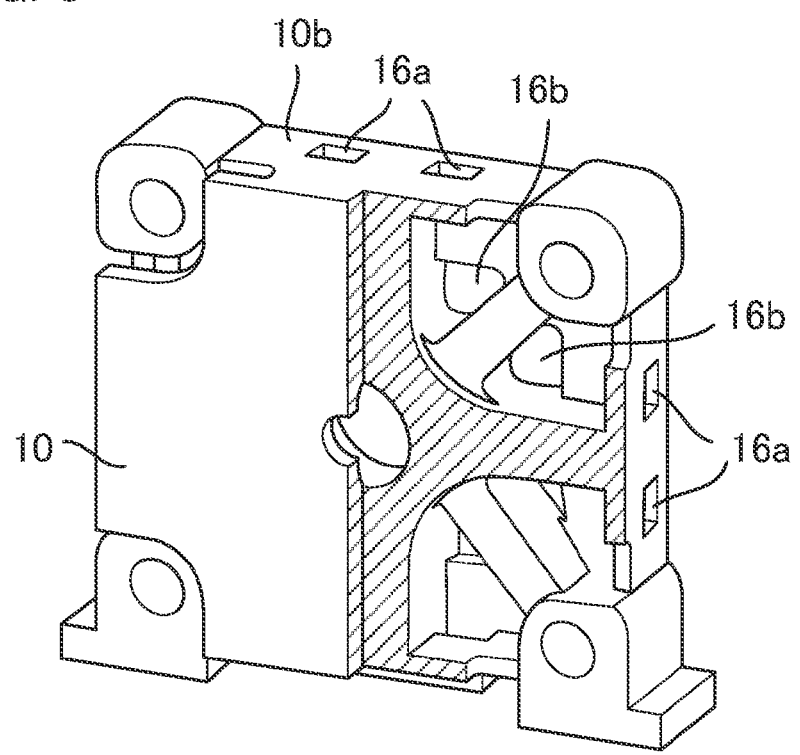
FIG. 8 is a diagram illustrating a third embodiment of the fixed platen according to the invention.
Figure 9A:
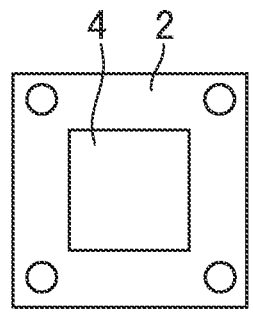
FIGS. 9A and 9B are diagrams illustrating aspects of deformation of the first example of a conventional fixed platen during mold clamping.
Figure 9B:
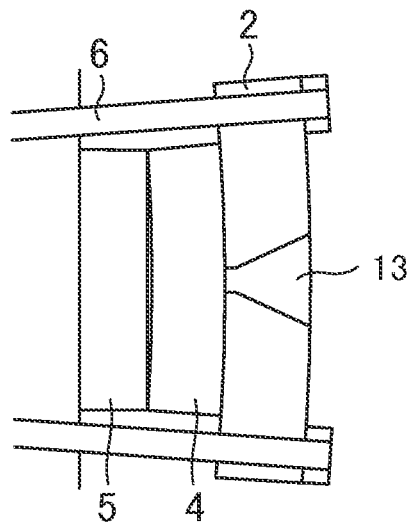
Figure 10A:
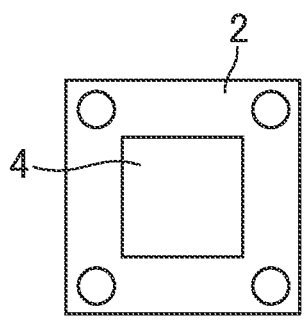
FIGS. 10A and 10B are diagrams illustrating aspects of deformation of the second example of the conventional fixed platen during mold clamping.
Figure 10B:
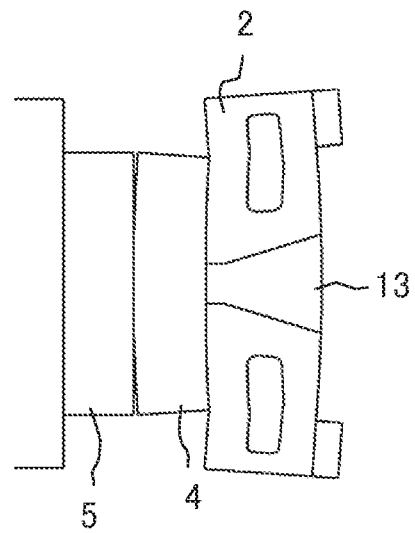

In this embodiment, as illustrated in FIG. 8, a through hole 16a is formed in the extension connecting portion 10b of the load transmitting portion 10, and another through hole 16b is formed in the tie bar support portion 9. Since a cored opening 14 is provided on the inner side of the tie bar support portion 9, it is difficult to remove sand remaining therein at the time of casting production.

In this embodiment, by forming the through holes 16a and 16b in the extension connecting portion 10b of the load transmitting portion 10 and the tie bar support portion 9, respectively, internal sand generated during the casting production is easily removed through the through holes 16a and 16b. In this embodiment, although the through holes 16a and 16b are provided in the extension connecting portion 10b of the load transmitting portion 10 and the tie bar support portion 9, as long as the internal sand is easily removed from the inside to the outside, it is also possible to provide such through holes in other members. Also, the shape of the through holes 16a and 16b may be any shape such as a round or a square.

The invention claimed is:

1. A fixed platen for an injection molding machine, the fixed platen comprising:
   a mold mounting portion;
   a tie bar support portion that is disposed to be spaced apart from the mold mounting portion and has a tie bar insertion portion configured to fix a tie bar; and
   a load transmitting portion that connects the mold mounting portion with the tie bar support portion,
   wherein
   the mold mounting portion has a mold mounting surface configured to mount a mold thereon, the mold mounting surface is on a side opposite the load transmitting portion,
   the load transmitting portion includes:
      a cross-shaped connecting portion that has a central portion and a plurality of connecting members each of which extends from the central portion to a vicinity of an outer circumferential portion of the mold mounting portion, and
      an extension connecting portion that extends along the outer circumferential portion of the mold mounting portion from a location where a corresponding connecting member among the plurality of connecting members of the cross-shaped connecting portion extends to the vicinity of the outer circumferential portion of the mold mounting portion, and
   an end portion of the extension connecting portion is spaced apart from the tie bar insertion portion.

2. The fixed platen according to claim 1,
   wherein the connecting member of the cross-shaped connecting portion has a tapered shape toward the extension connecting portion from the central portion of the cross-shaped connecting portion.

3. The fixed platen according to claim 1, further comprising:
   a through hole penetrating the fixed platen from a space between the mold mounting portion and the tie bar support portion to an outside of the fixed platen.

* * * * *